C. E. VAUTRAIN.
COLOR CHART.
APPLICATION FILED APR. 10, 1920.

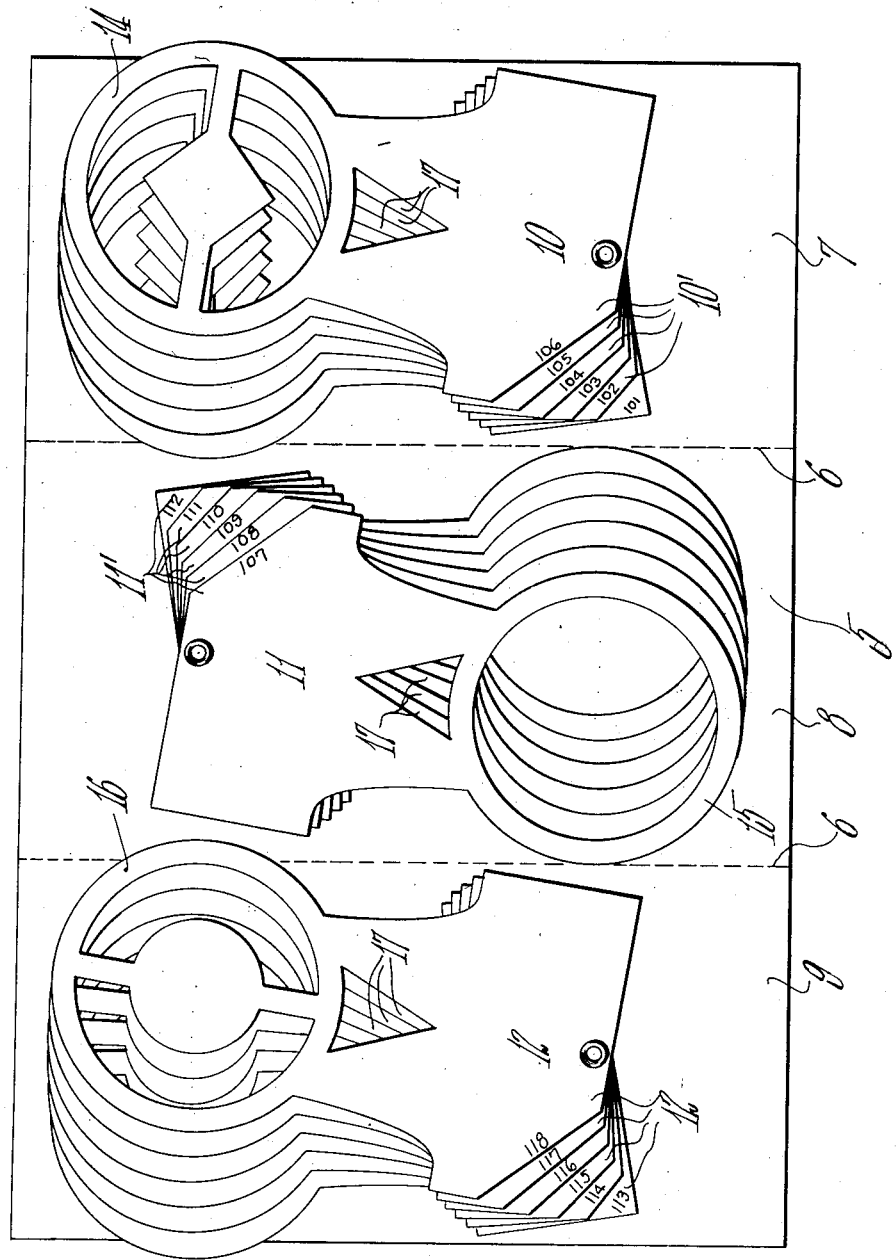

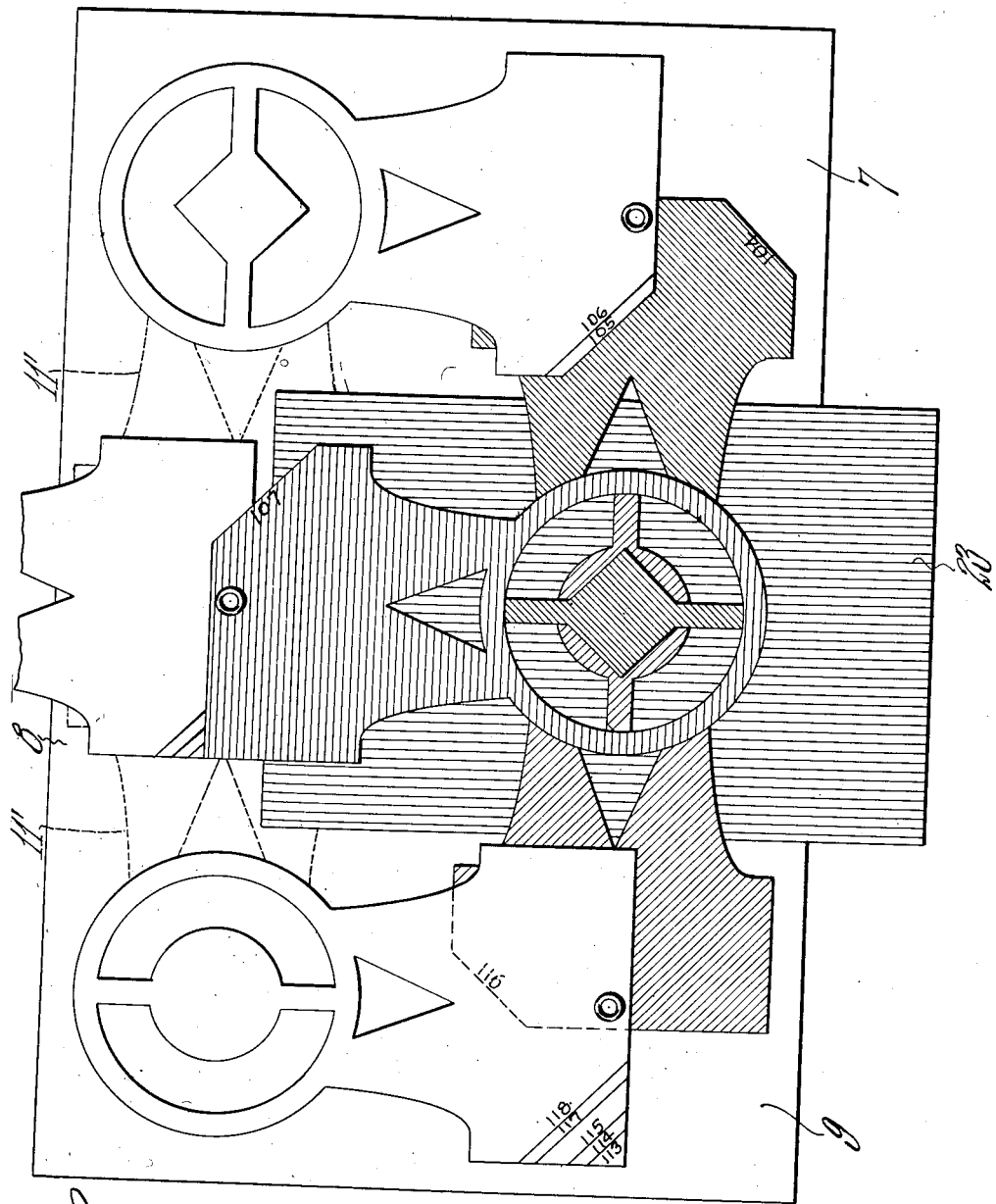

1,391,286.

Patented Sept. 20, 1921.
3 SHEETS—SHEET 3.

INVENTOR
Charles E. Vautrain.
BY
ATTORNEYS.

UNITED STATES PATENT OFFICE.

CHARLES E. VAUTRAIN, OF HOLYOKE, MASSACHUSETTS.

COLOR-CHART.

1,391,286.   Specification of Letters Patent.   Patented Sept. 20, 1921.

Application filed April 10, 1920. Serial No. 372,886.

*To all whom it may concern:*

Be it known that I, CHARLES E. VAUTRAIN, citizen of the United States, residing at Holyoke, in the county of Hampden and State of Massachusetts, have invented new and useful Improvements in Color-Charts, of which the following is a specification.

This invention relates to improvements in color charts and may be advantageously used by printers, artists and others preparatory to starting work involving a combination of colors, and where it is desired that such colors shall present a harmonious relation one to the other.

Printers in determining the colors and the proportions thereof in a combination, usually make several proofs of the work before a suitable combination is obtained and which necessarily results in a loss of time and material.

An object of this invention is to provide a device by the use of which, it is possible to visualize and arrange various colors in combination upon various back grounds, and to therefrom determine the relative proportions of the various colors in the combination, or to rearrange the colors to any desired combination.

Another object is to provide a device that will aid in the selection of the colors comprising the combination.

The preferred embodiment of my invention is illustrated in the accompanying drawings, but many changes may be made in the arrangement of the colored sheets and the coloring thereof without departing from the scope of the invention.

In the drawings:

Figure 1 is a plan view of the chart;

Fig. 2 is a plan view of the chart with certain of the color units in overlapped relation and superimposed over a background;

The color chart device, for convenience in handling and for compactness, is preferably made in the form of a folder.

Figure 3:
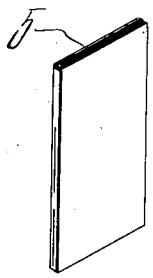
Fig. 3 is a perspective view of the chart in a folded relation.

The folder which may be made from any suitable material, comprises the support 5, which is scored at 6 and 6, for dividing the support into three panels 7, 8 and 9. This scoring permits the panels 7 and 9 to be folded upon the center portion 8 as in Fig. 3.

A plurality of groups of 10, 11 and 12 each comprising a plurality of different colored units as 10', 11', and 12' are secured at different locations on the support sections 7, 8 and 9 by eyelets 13 or other suitable means, whereby the units may be moved relatively one to the other, see Fig. 1.

As many units may be used in the various groups as is desired, and may be of any color or arrangement. A color arrangement that I have found to harmonize and to be of practical use will now be described with reference to Fig. 1. The units 10' of the group 10 form a chromatic scale in red and blend from the red lowermost unit through orange to brown as the uppermost unit. The units 11' of the group 11 form a similar scale in blue blending chromatically from a blue uppermost unit to a gray lowermost unit. The units 12' of the group 12 form a chromatic scale in yellow and blend from a yellow lowermost unit to a green uppermost unit.

In selecting colors for the various groups or scales, it is desirable that the colors should bear a proportionate density one to the other in order to permit harmonious combinations, when colored units of the same density are overlapped.

The units 10', 11', and 12' as will be seen by reference to Fig. 1 are provided with registering portions 14, 15, and 16 and are secured to their respective panels in such a relation that one of the units of the various groups may be positioned to bring the registering portions thereof into a registering and overlapped relation with units of the other groups, as shown in Fig. 2. The registering portions 14, 15, 16 of each group of units 10', 11', 12' have different shaped cut outs or perforations as shown so that when units from different groups are overlapped, portions of each unit as well as a background beneath all of said overlapped units may be visible.

The units 10', 11', and 12' are also provided with a cut out 17 through which a background placed beneath the units may be visible. The units of each group have their lower right hand corners cut away or beveled, whereby identification characters may be placed upon each for the purpose as will hereinafter be described.

Figure 4:
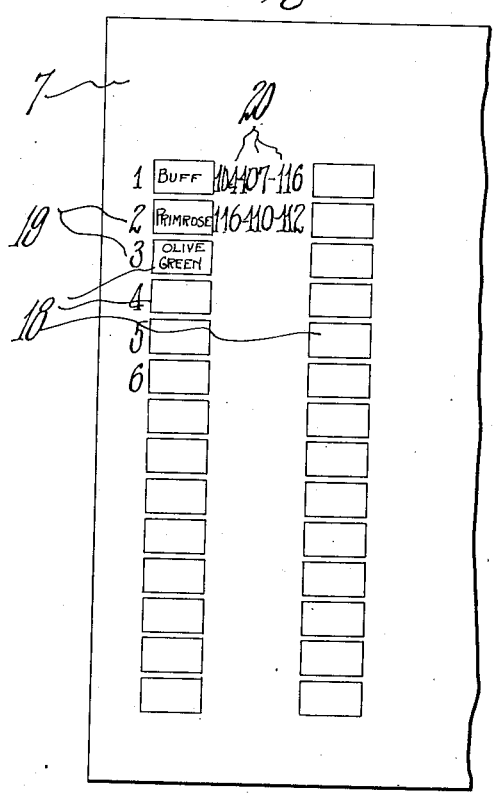
Fig. 4 is a fragmentary view of the reverse side of one flap of the chart.

The reverse side of the flap 7 is provided with rectangular spaces 18 see Fig. 4 in which are located various background colors. These colors may be designated by suitable numerals or characters as at 19 and adjacent these rectangles of color 18 are placed numerals as at 20, which indicate that color units such as 10', 11' and 12' and bearing corresponding numerals when used with the particular background will present a harmonious combination of color. In other words, this arrangement of numbered color panels 18 serves as a key in facilitating the use of the chart.

In operation a back ground of a desired color and shade is selected and for descriptive purposes assume it is of buff color or No. 1 of the background key or panel 7. This background 23 of buff color is then placed in the position shown in Fig. 2. By reference to the back ground key, it will be noted that the numerals 104, 107, and 116 are adjacent the background panel No. 1, to indicate that color units bearing these numbers will present a harmonious combination when overlapped upon the particular buff colored background sheet 23.

The color units designated by key numbers 104, 107, and 116 previously referred to, are now brought into overlapping relation and as will be seen, in Fig. 2, illustrate a color combination in this instance comprising a buff background 23, with superimposed units of a shade of brown, a shade of blue and a shade of green.

It will now be seen that the background is visible through the cut outs 17 and the other perforations of the overlapping portions of the superimposed color units, and when thus arranged, the harmony and proportions of the color represented by the various units may be visualized. If desired, the arrangement or proportion of the color combination may be changed by placing the sheet 107 adjacent the back ground 23, the sheet 116 on top and the sheet 104 between the two, by which arrangement a considerable portion of the sheets 104 and 107 are covered by the sheet 116 whereby it will be seen that the green shade 116 will predominate in the combination.

The superimposed color units may be also displaced slightly out of register if desired to produce the effect of greater or less proportion of any one color. Further color effects and combinations may be obtained by overlapping any of the color units 11' of group 11 with the color units of groups 10 and 12 at the upper right and left hand corners of the support 7 as shown in dotted lines, Fig. 2.

What I claim is—

1. A color chart comprising in combination, a support, a plurality of groups of colored elements mounted thereon, each of said groups comprising a plurality of relatively movable elements arranged so that any element of any group may be brought into an overlapping relation with any of the elements of any other group.

2. A color chart comprising in combination, a support, a plurality of groups of colored elements mounted thereon, each of said groups comprising a plurality of relatively movable elements arranged so that any element of any of the said groups may be moved relatively to the other elements of the group into various partly overlapping relations.

3. A color chart comprising in combination, a support, a plurality of groups of colored elements, each of said groups comprising a plurality of relatively movable elements arranged so that any of the elements of a group may be moved into various overlapped relations and the other elements of the group may be positioned in an overlapping relation with other elements of another group.

4. A color chart comprising in combination, a support, a plurality of groups of colored elements mounted thereon, each of said groups comprising a plurality of relatively movable elements arranged so that the elements of each group may be moved to a common position wherein the said elements may be arranged in various overlapping relation.

5. A color chart comprising in combination, a support, a plurality of colored elements mounted thereon for a relative movement and arranged in separate adjacent groups so that any element of any group may be moved to an overlapping relation with any of the elements of another group, said elements having cut-outs in the overlapping portions thereof whereby a background may be visible therethrough.

6. A color chart comprising in combination, a support, a plurality of colored elements mounted thereon for a relative movement and arranged in separate adjacent groups so that any element of any group may be moved to an overlapping relation with any of the elements of another group, each group of elements having unlike cut-outs therein whereby a portion of the elements of different groups may be visible through said cut-outs when elements of different groups are placed in an overlapping relation.

7. A color chart comprising in combination, a support, a plurality of colored elements mounted thereon for a relative movement and arranged in separate adjacent groups so that an element of one group may be moved to overlap a portion of the elements of another group, each group of elements having unlike cut-outs therein whereby a portion of the elements of different groups when overlapped may be visible through the said cut-outs, and a background placed beneath the elements may be visible through all of said cut-outs.

8. A color chart comprising in combination, a support, a plurality of colored elements pivotally mounted thereon, and arranged in separate adjacent groups so that any of the elements of any group may be moved into an overlapping relation with any of the elements of any other group, the said elements of each group having unlike cut-outs in the overlapping portion thereof, a background adapted to be overlapped by the said elements whereby when elements of different groups and the background are placed in an overlapping relation, the said background and portions of the elements may be visible through the cut-outs of the uppermost elements.

9. A color chart comprising in combination, a support, a plurality of groups of colored elements mounted thereon, each of said groups comprising a plurality of relatively movable elements having cut-outs in the overlapping portions thereof, the said groups of elements being so arranged that the elements of each group may be moved to a common position wherein they may be arranged in various overlapping relation.

In testimony whereof I have affixed my signature.

CHARLES E. VAUTRAIN.